(12) United States Patent
Mathur

(10) Patent No.: US 8,657,067 B1
(45) Date of Patent: Feb. 25, 2014

(54) ACOUSTIC DAMPING DEVICE FOR NOISE REDUCTION

(71) Applicant: Gopal Prasad Mathur, Trabuco Canyon, CA (US)

(72) Inventor: Gopal Prasad Mathur, Trabuco Canyon, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/626,237

(22) Filed: Sep. 25, 2012

(51) Int. Cl.
*E04B 1/82* (2006.01)

(52) U.S. Cl.
USPC .............................. 181/292; 181/290; 181/284

(58) Field of Classification Search
USPC .......................................... 181/292, 290, 284
See application file for complete search history.

(56) References Cited

U.S. PATENT DOCUMENTS

| 4,084,366 | A | * | 4/1978 | Saylor et al. ................. | 52/791.1 |
| 4,084,367 | A | * | 4/1978 | Saylor et al. .................. | 428/113 |
| 4,155,211 | A | * | 5/1979 | Saylor et al. ................. | 52/794.1 |
| 5,445,861 | A | * | 8/1995 | Newton et al. ................ | 428/116 |
| 5,912,442 | A | * | 6/1999 | Nye et al. ...................... | 181/292 |
| 7,059,089 | B1 |   | 6/2006 | Fontaine |   |
| 7,661,510 | B2 | * | 2/2010 | Muller .......................... | 181/292 |
| 2003/0098200 | A1 | * | 5/2003 | Clark ............................ | 181/292 |
| 2005/0194210 | A1 | * | 9/2005 | Panossian ..................... | 181/293 |
| 2009/0250293 | A1 | * | 10/2009 | Gleine et al. ................. | 181/292 |

OTHER PUBLICATIONS

Jung et al., "Sound Absorption of Micro-Perforated Panel," Journal of the Korean Physical Society, vol. 50, No. 4, Apr. 2007, pp. 1004-1051.
Toyoda et al., "Sound transmission through a microperforated-panel structure with subdivided air cavities," Journal of Acoustical Society of America, vol. 124, No. 6, Dec. 2008, pp. 3594-3603.
Tao et al., "Prediction of Sound Absorbing Performance of Micro-Perforated Panels using the Transfer Matrix Method," Society of Automotive Engineers, Inc., May 2005, 4 Pages.
Rao, "Recent applications of viscoelastic damping for noise control in automobiles and commercial airplanes," Journal of Sound and Vibration, vol. 262, Issue 3, May 2003, pp. 457-474.

* cited by examiner

*Primary Examiner* — Forrest M Phillips
(74) *Attorney, Agent, or Firm* — Yee & Associates, P.C.

(57) ABSTRACT

A method and apparatus for reducing sound. A layer of material has holes extending from a first side of the layer of material to a second side of the layer of material. The holes are configured to provide a desired level of acoustic resistance to sound traveling through the layer of material. The layer of material is configured to be mounted to a platform.

20 Claims, 13 Drawing Sheets

ACOUSTIC DAMPING DEVICE FOR NOISE REDUCTION

BACKGROUND INFORMATION

1. Field

The present disclosure relates generally to aircraft and, in particular, to noise inside an aircraft. Still more particularly, the present disclosure relates to a method and apparatus for reducing noise inside an aircraft.

2. Background

Sound generated by an aircraft is often unwanted. Sound is an acoustical wave that is an oscillation of pressure transmitted through a medium such as a solid, a liquid, or a gas. Sound typically has one or more frequencies within a range that can be heard by a person. Unwanted sound is referred to as noise. For example, noise may be generated while the aircraft is on the ground, taxiing, taking off, ascending, during level flight, descending, landing, and during other phases of flight.

The noise generated inside an aircraft may come from various sources. For example, an aircraft may generate aerodynamic noise. Aerodynamic noise is noise that arises from airflow around the fuselage of the aircraft, the wings, control surfaces, and other surfaces of the aircraft. This type of noise typically increases with aircraft speed. Aerodynamic noise also may occur with the operation of parts of an aircraft such as rotors on a helicopter and blades on a propeller of an airplane.

Other types of noise may include engine and mechanical noise that is caused by the operation of an engine, gear box, transmission, and other components within or outside the aircraft. Noise may also occur from various systems such as environmental systems in an auxiliary power unit and other systems that may operate inside the aircraft.

The noise generated by the aircraft and from other sources external to the aircraft may be undesirable to people in the environment outside of the aircraft as well as passengers and crew members inside the aircraft.

These and other types of noises generated by an aircraft may be reduced by different mechanisms. These mechanisms may include, for example, active mechanisms, passive mechanisms, or a combination of active mechanisms and passive mechanisms. Active mechanisms may use elements such as speakers, actuators, microphones, and other components to generate an out-of-phase signal to cancel the noise. A passive mechanism may include devices such as absorbers, barriers, mufflers, silencers, and other components.

Currently, newer types of structures are being used in the construction of aircraft. These structures may be, for example, composite structures that are lighter in weight and have a higher stiffness than previously used metal structures. These types of structures are more efficient in radiating noise than metal structures. As a result, the control of noise within the aircraft may become more challenging with the use of composite materials in the aircraft.

Currently used noise reduction systems for reducing noise may be enhanced to take into account the increased noise that may be generated by these composite structures. However, technical challenges are present with regard to improving noise reduction systems for aircraft. These challenges include taking into account weight, cost, complexity, and performance of the noise reduction systems. In particular, improving the noise reduction capabilities of currently available noise reduction systems may result in an undesired weight and cost for those systems.

For example, currently used systems may include elements such as damping, fiberglass blankets, acoustic foam, trim panels, isolators, and other components. As an example, damping tiles may be placed onto structural panels to absorb vibration energy. Fiberglass blankets, acoustic foam layers, or both fiberglass blankets and acoustic foam layers also may be added to absorb noise that may radiate from these panels. In other cases, existing fiberglass blankets and viscoelastic damping tiles may be replaced with thicker versions.

These solutions may be less efficient, more costly, and add more weight than desired when redesigning noise reduction systems to take into account increases in noise that may be caused by composite structures. Therefore, it would be desirable to have a method and apparatus that takes into account at least some of the issues discussed above, as well as other possible issues.

SUMMARY

In one illustrative embodiment, an apparatus comprises a layer of material. The layer of material has holes extending from a first side of the layer of material to a second side of the layer of material. The holes are configured to provide a desired level of acoustic resistance to sound traveling through the layer of material. The layer of material is configured to be mounted to a platform.

In another illustrative embodiment, a method for reducing sound is presented. Sound is received at a layer of material. An amplitude of the sound traveling through the layer of material is reduced using holes in the layer of material. The holes extend from a first side of the layer of material to a second side of the layer of material in a manner that provides a desired level of acoustic resistance to the sound traveling through the layer of material.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that a noise reduction system may include one or more components that reduce the propagation of unwanted sound. This unwanted sound may be referred to as noise. These components may be added to increase sound absorption and transmission losses as noises are generated. In particular, the illustrative embodiments recognize and take into account that adding acoustic resistance in the path of sound radiated from a structure may increase noise reduction without undesired increases in at least one of weight and cost.

The illustrative embodiments recognize and take into account that currently available noise reduction systems may include a fiberglass blanket that may be placed on a fuselage panel, a wall of the fuselage, or other structures within the aircraft. The illustrative embodiments recognize and take into account that the fiberglass blanket may be selected to provide a desired level of sound absorption at desired frequencies. These frequencies may be high frequencies. High frequencies may be frequencies in a range from about 1,000 Hz to about 10,000 Hz. However, the fiberglass blanket may not provide the desired level of noise reduction at lower frequencies. Lower frequencies may be, for example, frequencies that are less than about 500 Hz.

Further, the illustrative embodiments recognize and take into account that the amount of noise reduction may not be as great as desired for the size, weight, cost and other factors relating to the use of fiberglass blankets. Moreover, the fiberglass blankets primarily absorb sound and do not provide a desired level of acoustic resistance. In other words, materials that are used for absorption typically provide poor resistive properties.

The illustrative embodiments also recognize and take into account that high acoustic resistance may result in less sound propagating through a material. The acoustic resistance properties of a material may be different than the absorptive properties of the material. For example, resistive materials may deflect or reflect aircraft noise, rather than absorb that noise. As a result, less noise may propagate through the structure into the interior area of an aircraft.

Thus, in one illustrative embodiment, an apparatus comprises a layer of material having holes. The holes extend from a first side of the layer of material to a second side of the layer of material. The holes are configured to provide a desired level of acoustic resistance to sound traveling through the layer of material. Further, the layer of material is configured to be mounted to a platform.

Figure 1:
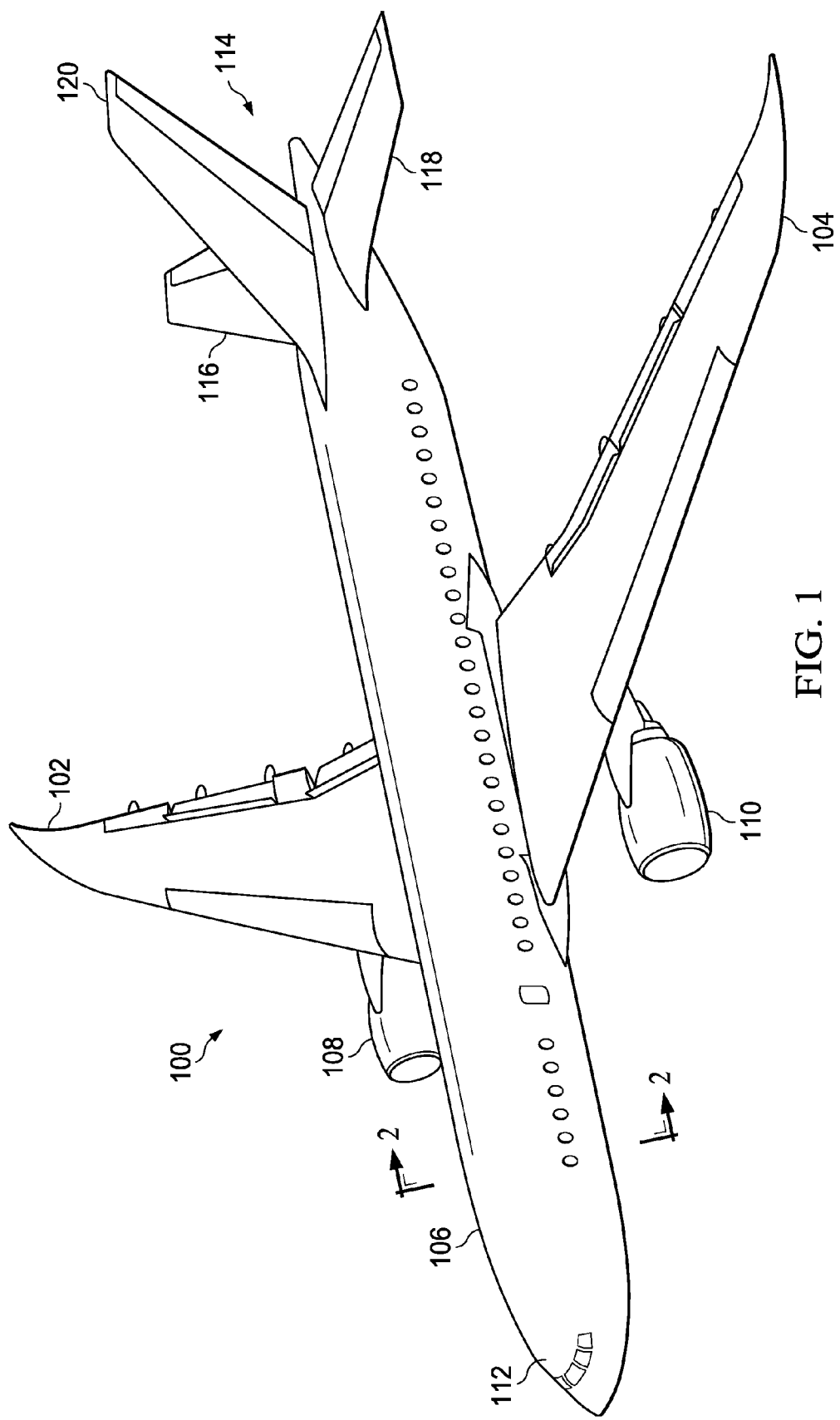
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to fuselage 106.

Aircraft 100 includes engine 108 attached to wing 102 and engine 110 attached to wing 104. Fuselage 106 has nose 112 and tail section 114. Horizontal stabilizer 116, horizontal stabilizer 118, and vertical stabilizer 120 are attached to tail section 114 of fuselage 106.

Aircraft 100 is an example of an aircraft in which a noise reduction system may be implemented in accordance with an illustrative embodiment. In these illustrative examples, a noise reduction system may be implemented at various locations in aircraft 100 to reduce sound generated by aircraft 100. In particular, the noise reduction system may reduce noise that reaches the interior of aircraft 100 where passengers, crew members, and other human operators may be located.

In these illustrative examples, a noise reduction system may be implemented in association with fuselage 106, engine 108, engine 110, as well as other components in aircraft 100. Further, the noise reduction system may be present in floors within aircraft 100 that may separate cabins and cargo areas from each other on different levels of aircraft 100. As a result of the use of a noise reduction system in aircraft 100, less noise may travel into the interior areas of aircraft 100.

Figure 2:
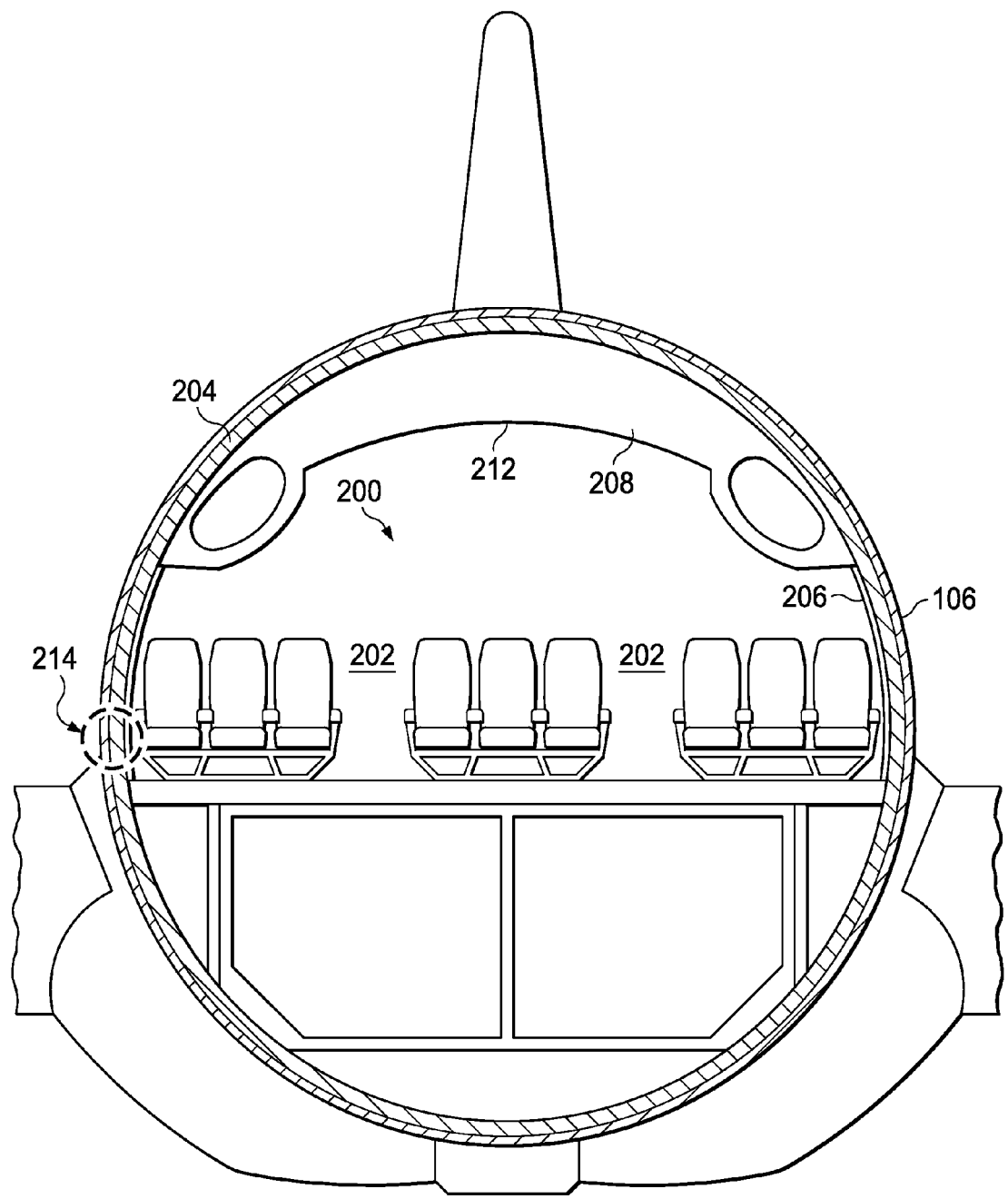
FIG. 2 is an illustration of a cross section of an aircraft in accordance with an illustrative embodiment.

Turning now to FIG. 2, an illustration of a cross section of an aircraft is depicted in accordance with an illustrative embodiment. In this illustrative example, a cross-sectional view of aircraft 100 is seen taken along line 2-2 in FIG. 1. In this cross-sectional view, cabin 200 can be seen in interior 202 of aircraft 100.

In this illustrative example, noise reduction systems may be implemented in various locations to reduce noise that may reach cabin 200 or noise that may travel out of cabin 200. For example, noise reduction system 204 may be located between fuselage 106 and cabin wall 206. In another illustrative example, noise reduction system 204 may be located in crown 208 of aircraft 100 in FIG. 1. Crown 208 is the space above cabin 200.

In another illustrative example, noise reduction system 204 may be located between fuselage 106 and ceiling 212 in crown 208.

As depicted, noise reduction system 204 may be located in section 214 of aircraft 100. Section 214 is shown and described in more detail below.

Figure 3:
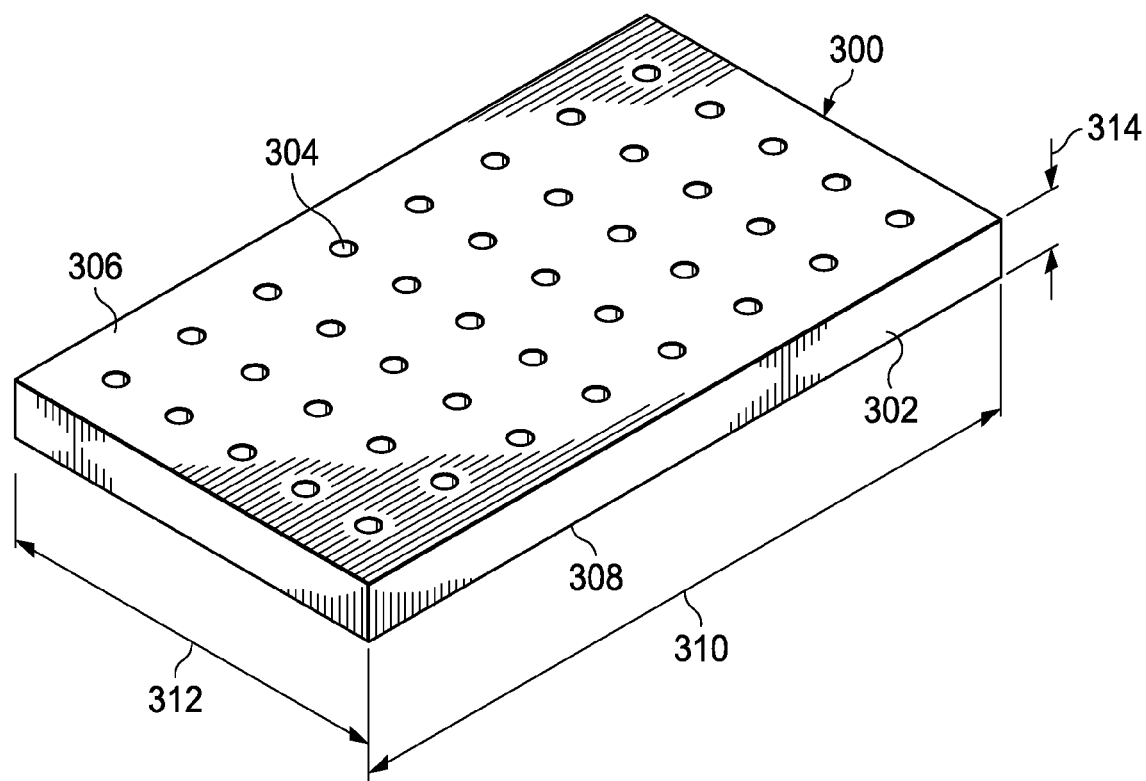
FIG. 3 is an illustration of an acoustic damping device in accordance with an illustrative embodiment.

Turning now to FIG. 3, an illustration of an acoustic damping device is depicted in accordance with an illustrative embodiment. In this illustrative example, an isometric view of acoustic damping device 300 is shown. Acoustic damping device 300 is configured to be mounted to a platform. In these examples, the platform is aircraft 100 in FIG. 1.

As depicted, acoustic damping device 300 is comprised of layer of material 302 with holes 304. Holes 304 extend from first side 306 of layer of material 302 to second side 308 of layer of material 302. In this illustrative example, layer of material 302 is rectangular in shape and has length 310, width 312, and thickness 314. As depicted, layer of material 302 is shown as a planar structure. Of course, layer of material 302 may have other configurations. For example, layer of material 302 may be curved or have any other configuration suitable for placement with respect to a structure in aircraft 100. In other words, the shape of acoustic damping device 300 may be selected to conform to the shape of a structure to which acoustic damping device 300 is to be associated with when installed.

When one component is "associated" with another component, the association is a physical association in the depicted examples. For example, a first component, acoustic damping device 300, may be considered to be associated with a second component, an aircraft structure, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Further, layer of material 302 may be associated with a panel in aircraft 100. This panel may be selected from one of a wall panel, a ceiling panel, a floor panel, or some other panel within aircraft 100.

In these illustrative examples, layer of material 302 may be rigid, flexible or deformable depending on the particular implementation.

As depicted, holes 304 are configured to provide a desired level of acoustic resistance to sound traveling through layer of material 302. In these illustrative examples, holes 304 are evenly distributed on layer of material 302. Also, holes 304 extend all of the way through first side 306 of layer of material 302 to second side 308 of layer of material 302 in the illustrative examples.

In this illustrative example, length 310 may be about six inches, width 312 may be about four inches, and thickness 314 may be about 0.008 inches. Of course, these dimensions are provided only as examples for one implementation of an illustrative embodiment. Other implementations may have other dimensions.

In some illustrative examples, thickness 314 of layer of material 302 may be substantially the same as the diameter of holes 304. In other illustrative examples, holes 304 may have a diameter that is not substantially equal to thickness 314.

Figure 4:
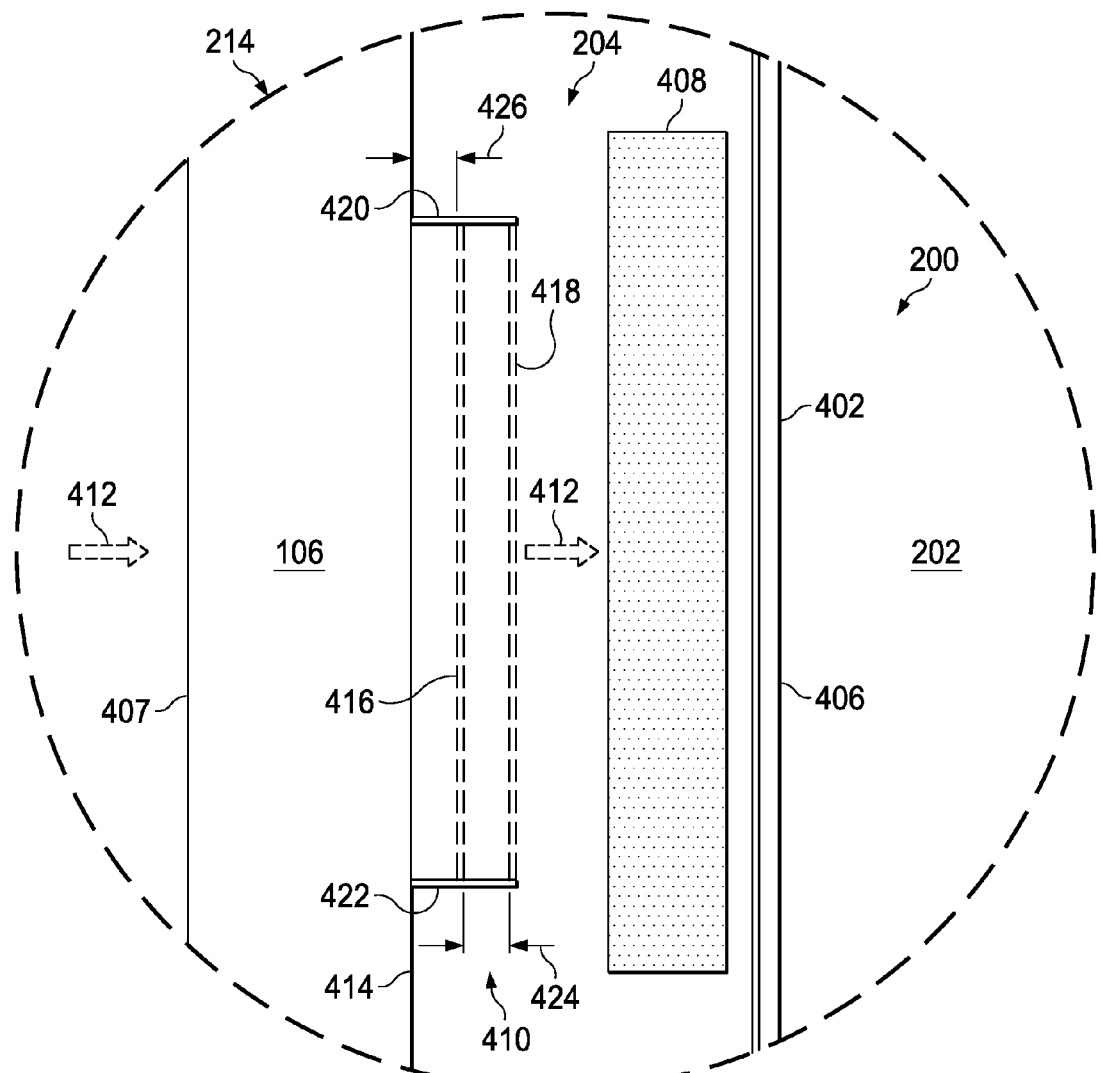
FIG. 4 is an illustration of a section of an aircraft with a noise reduction system in accordance with an illustrative embodiment.

Turning now to FIG. 4, an illustration of a section of an aircraft with a noise reduction system is depicted in accordance with an illustrative embodiment. A more detailed illustration of section 214 is shown in this figure.

As depicted, noise reduction system 204 in section 214 is located between trim panel 402 and fuselage 106. Side 406 of trim panel 402 faces interior 202 of cabin 200. Side 407 of fuselage 106 faces the exterior of aircraft 100 in FIG. 1.

In this illustrative example, noise reduction system 204 includes fiberglass blanket 408 and acoustic damping structure 410. Fiberglass blanket 408 is configured to absorb sound 412 that may be transmitted through fuselage 106, from external sources.

In this illustrative example, acoustic damping structure 410 is configured to provide acoustic resistance to sound 412 when sound 412 travels through acoustic damping structure 410. This acoustic resistance of sound 412 results in acoustic resistive damping as sound 412 passes through acoustic damping structure 410.

For example, sound 412 may travel through fuselage 106. As sound 412 travels through fuselage 106, the magnitude of sound 412 may be reduced by acoustic dampening structure 410 and fiberglass blanket 408. Specifically, sound 412 may be reduced by acoustic damping structure 410 and fiberglass blanket 408.

In this example, acoustic damping structure 410 reduces sound 412 by generating acoustic resistance to sound 412. As the magnitude of sound 412 is reduced by acoustic damping structure 410, fiberglass blanket 408 absorbs sound 412. As a result, less sound 412 passes into interior 202 of cabin 200 of aircraft 100.

Acoustic damping structure 410 is connected to side 414 of fuselage 106 in these illustrative examples. Acoustic damping structure 410 is comprised of acoustic damping device 416, acoustic damping device 418, support member 420, and support member 422. In this illustrative example, acoustic damping device 416 and acoustic damping device 418 may be implemented using acoustic damping device 300 as shown in FIG. 3.

Support member 420 and support member 422 are associated with acoustic damping device 416 and acoustic damping device 418. In these illustrative examples, support member 420 and support member 422 provide space between acoustic damping device 416 and acoustic damping device 418. Specifically, support member 420 and support member 422 provide spacing 424 between acoustic damping device 416 and acoustic damping device 418. Further, these support members also provide spacing 426 between acoustic damping device 416 and fuselage 106.

Support member 420 and support member 422 may be any structure that is configured to support acoustic damping device 416 and acoustic damping device 418 and hold those devices in place with respect to fuselage 106. For example, support member 420 and support member 422 may be plastic flanges or other suitable structures.

Further, support member 420 and support member 422 may be portions of fuselage 106 or cabin 200 in these illustrative examples. As an example, support member 420 may be a stringer on first side of a skin pocket of fuselage 106 and support member 422 may be a stringer on the second side of a skin pocket of fuselage 106.

Of course, support member 420 and support member 422 may be other structures in fuselage 106, cabin 200, or both fuselage 106 and cabin 200. As a result, acoustic damping device 416 and acoustic damping device 418 may be installed in noise reduction system 204 without extensive rework of fuselage 106, cabin 200, or both.

Figure 5:
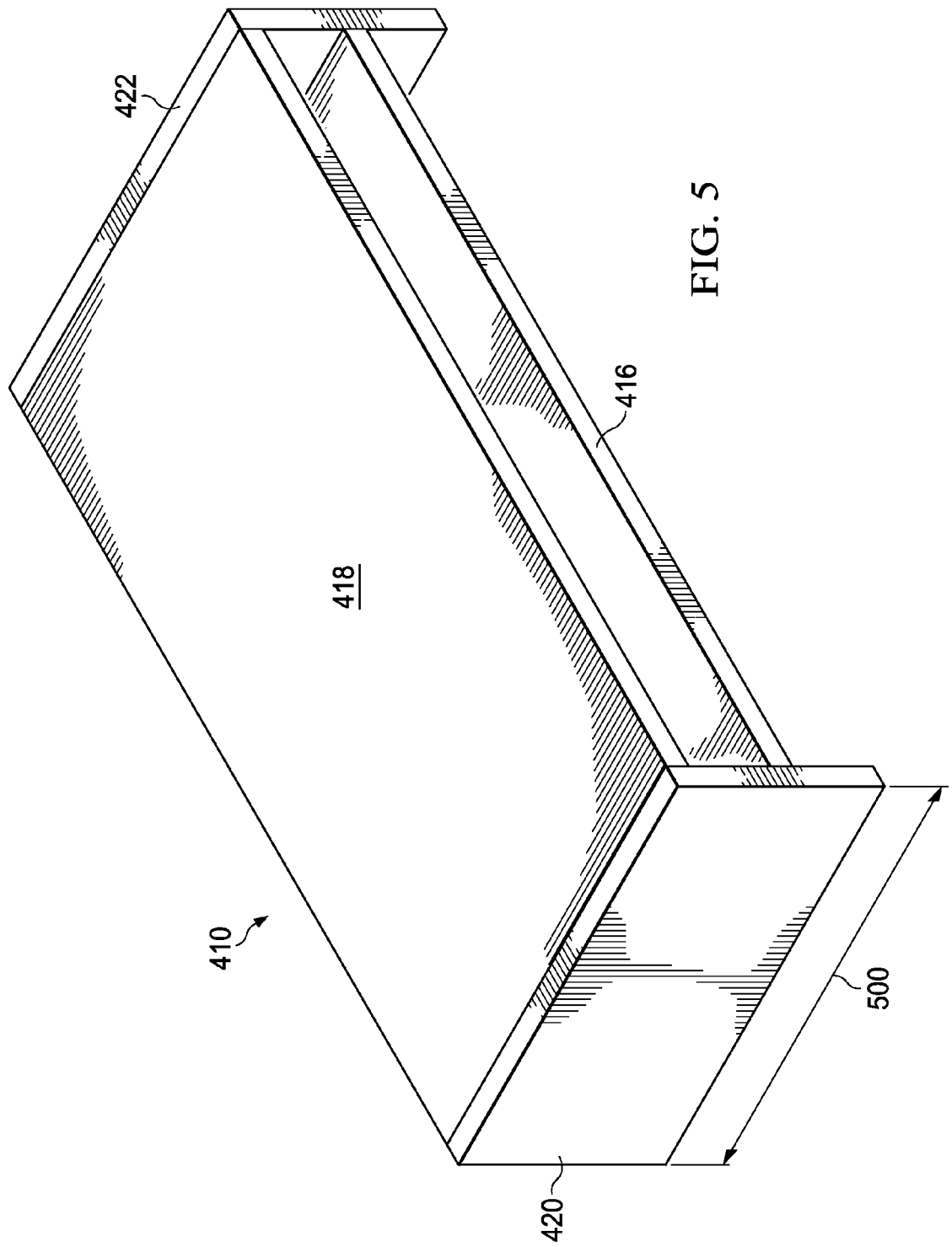
FIG. 5 is an illustration of an acoustic damping structure in accordance with an illustrative embodiment.

Turning now to FIG. 5, an illustration of an acoustic damping structure is depicted in accordance with an illustrative embodiment. In this depicted example, an isometric view of acoustic damping structure 410 in FIG. 4 is illustrated. In this view, support member 420 and support member 422 extend along width 500 for acoustic damping device 416 and acoustic damping device 418.

In these illustrative examples, acoustic damping device 416 and acoustic damping device 418 may be bonded to support member 420 and support member 422. In other illustrative examples, acoustic damping device 416 and acoustic damping device 418 may be connected to support member 420 and support member 422 using other mechanisms such as fasteners or other suitable devices.

In still other illustrative examples, support member 420 and support member 422 may be formed as flanges or connectors between acoustic damping device 416 and acoustic damping device 418. In other words, with acoustic damping device 416 and acoustic damping device 418, support member 420 and support member 422 may be formed as a single part depending on the particular implementation.

Figure 6:
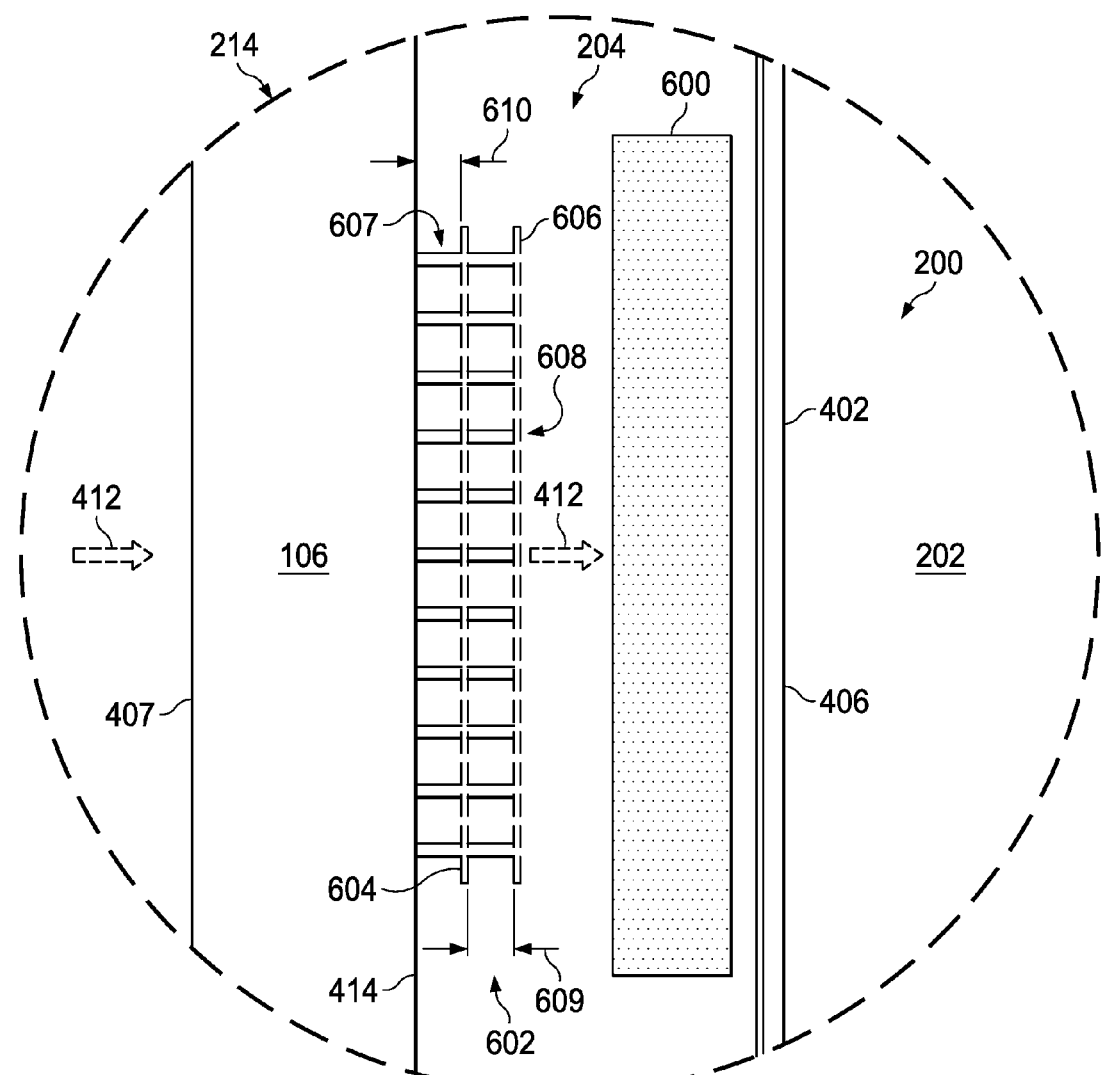
FIG. 6 is an illustration of a noise reduction system in accordance with an illustrative embodiment.

Turning now to FIG. 6, an illustration of a noise reduction system is depicted in accordance with an illustrative embodiment. In this depicted example, noise reduction system 204 is located between trim panel 402 and fuselage 106. As depicted, noise reduction system 204 includes fiberglass blanket 600 and acoustic damping structure 602.

In this depicted example, acoustic damping structure 602 is connected to side 414 of fuselage 106. Acoustic damping structure 602 is comprised of acoustic damping device 604 and acoustic damping device 606. Spacer system 607 may be used to provide spacing and support for acoustic damping device 604 and acoustic damping device 606. Specifically, spacers 608 are used to provide spacing 609 between acoustic damping device 604 and acoustic damping device 606. Additionally, spacers 608 also may provide spacing 610 between acoustic damping device 604 and fuselage 106.

Moreover, spacer system 607 may be used to support acoustic damping structure 602 in these illustrative examples. For example, if acoustic damping structure 602 is a more flexible material, spacers 608 may be needed to support acoustic damping structure 602 along side 414 of fuselage 106. Additionally, if support members, such as support member 420 and support member 422 in FIG. 4, are not present, spacers 608 may provide connections for acoustic damping structure 602 in fuselage 106.

Figure 7:
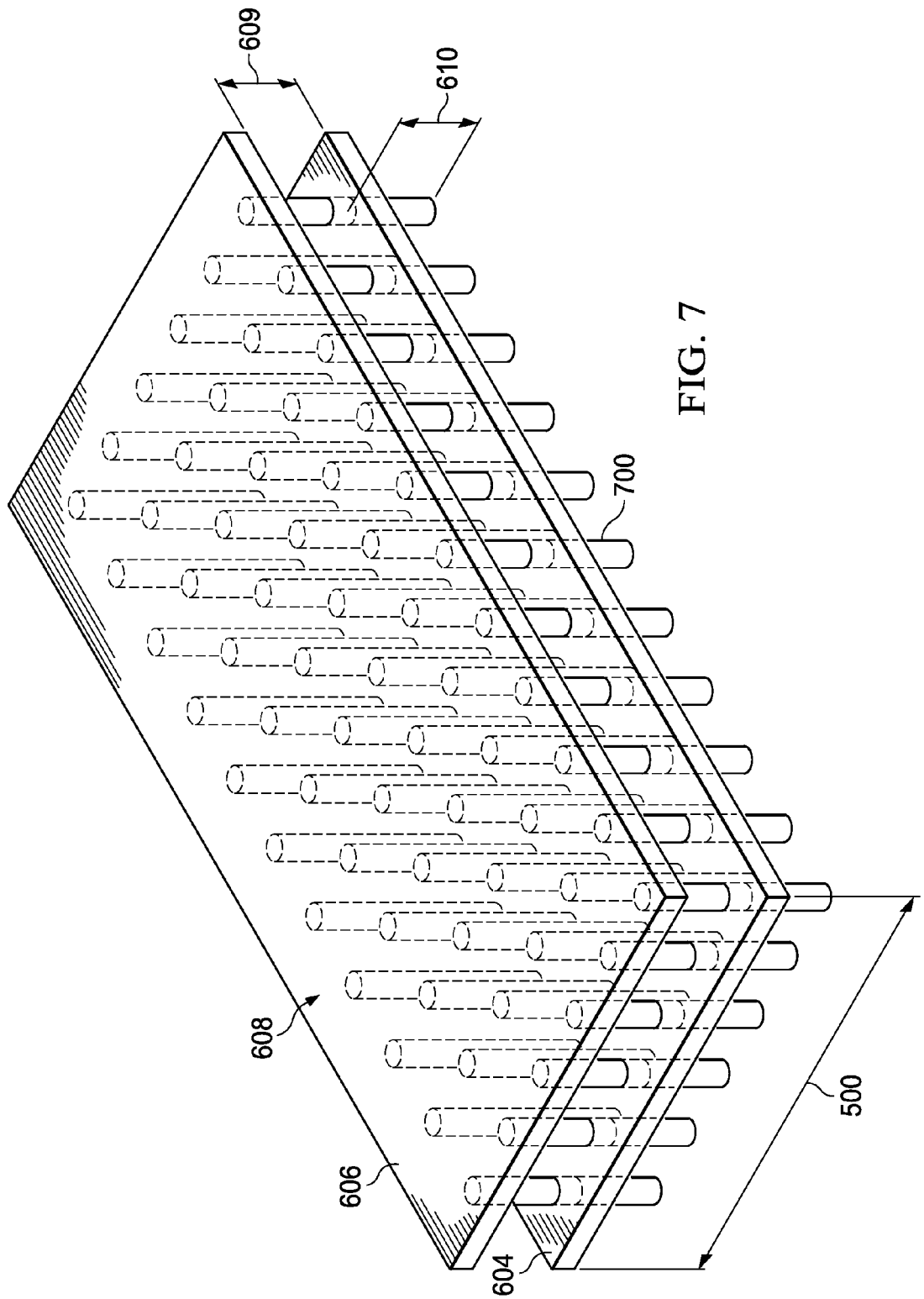
FIG. 7 is another illustration of an acoustic damping structure in accordance with an illustrative embodiment.

With reference now to FIG. 7, another illustration of an acoustic damping structure is depicted in accordance with an illustrative embodiment. In this depicted example, an isometric view of acoustic damping structure 602 is shown. In this isometric view, spacers 608 are shown as having a uniform distribution. As depicted, spacers 608 take the form of rod 700. In this illustration, rod 700 is uniformly distributed with respect to acoustic damping device 604 and acoustic damping device 606. Spacers 608 may be connected to acoustic damping device 604 and acoustic damping device 606 using an adhesive layer, fasteners, or other suitable devices.

Additionally, support members may be used with spacers 608. This combination may provide additional support to maintain spacing 609 and spacing 610 at a desired level.

Figure 8:
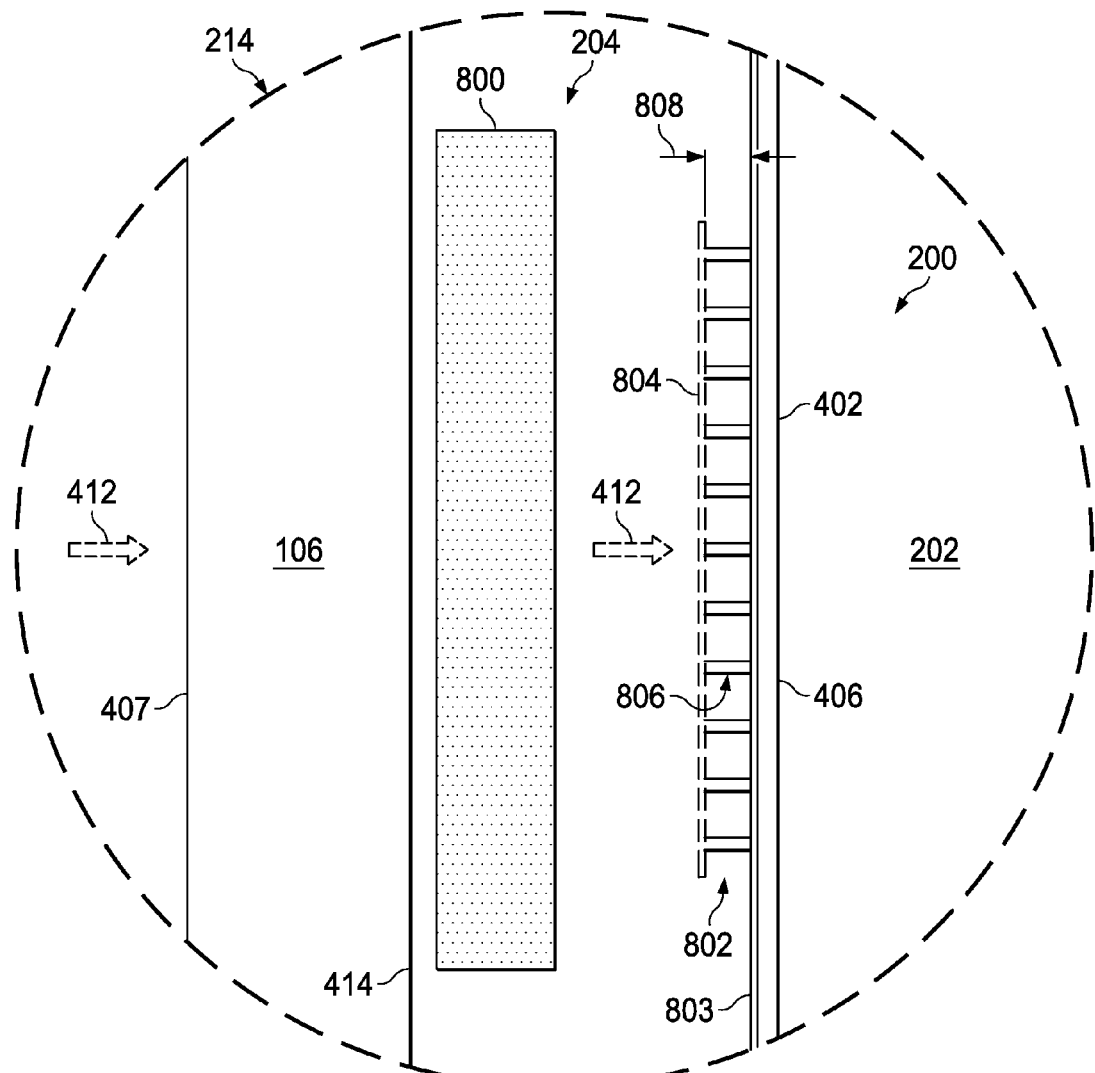
FIG. 8 is another illustration of a noise reduction system in accordance with an illustrative embodiment.

Turning now to FIG. 8, another illustration of a noise reduction system is depicted in accordance with an illustrative embodiment. In this depicted example, noise reduction system 204 in section 214 comprises fiberglass blanket 800 and acoustic damping structure 802. In this example, acoustic damping structure 802 is connected to side 803 of trim panel 402 instead of side 414 of fuselage 106.

As depicted, acoustic damping structure 802 is comprised of acoustic damping device 804 and spacers 806. Spacers 806 connect acoustic damping device 804 to side 803 of trim panel 402. In this illustrative example, spacers 806 provide spacing 808 between acoustic damping device 804 and side 803 of trim panel 402.

In this illustrative example, sound 412 is absorbed by fiberglass blanket 800. The portion of sound 412 that is not absorbed by fiberglass blanket 800 may reach acoustic damping structure 802. In this instance, acoustic damping structure 802 generates acoustic resistance to sound 412. As a result, less sound 412 may travel into interior 202 of cabin 200.

Figure 9:
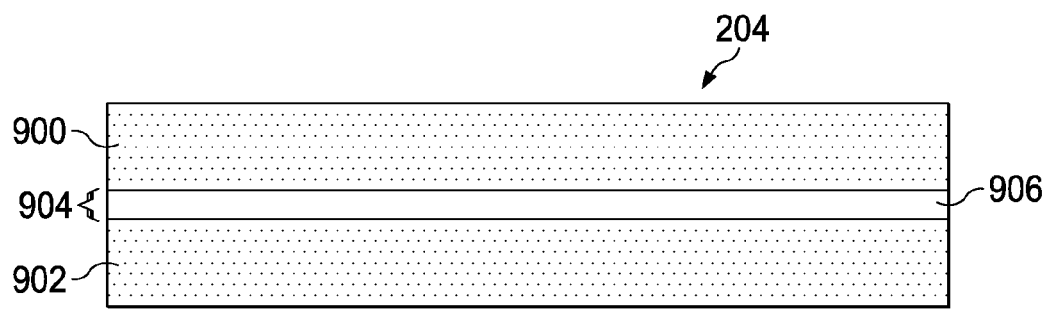
FIG. 9 is another illustration of an implementation for a noise reduction system in accordance with an illustrative embodiment.

With reference now to FIG. 9, another illustration of an implementation for a noise reduction system is depicted in accordance with an illustrative embodiment. In this depicted example, noise reduction system 204 is comprised of fiberglass blanket 900, fiberglass blanket 902, and acoustic damping structure 904. As depicted, acoustic damping structure 904 is located between fiberglass blanket 900 and fiberglass blanket 902. Further, acoustic damping structure 904 is comprised of acoustic damping device 906.

Although the illustration of noise reduction system 204 is depicted with two layers of a fiberglass blanket and one layer of acoustic damping structure 904, additional layers may be used. For example, five layers of fiberglass and four layers of an acoustic damping structure may be used in some illustrative examples. Of course, other numbers of layers of both a fiberglass blanket and an acoustic damping structure may be used.

Additionally, more than one acoustic damping device, a spacer system, or both may be present between layers of a fiberglass blanket. As a result, a desired level of sound 412 in FIG. 4 may be prevented from traveling into interior 202 of cabin 200 in FIG. 2.

Figure 10:
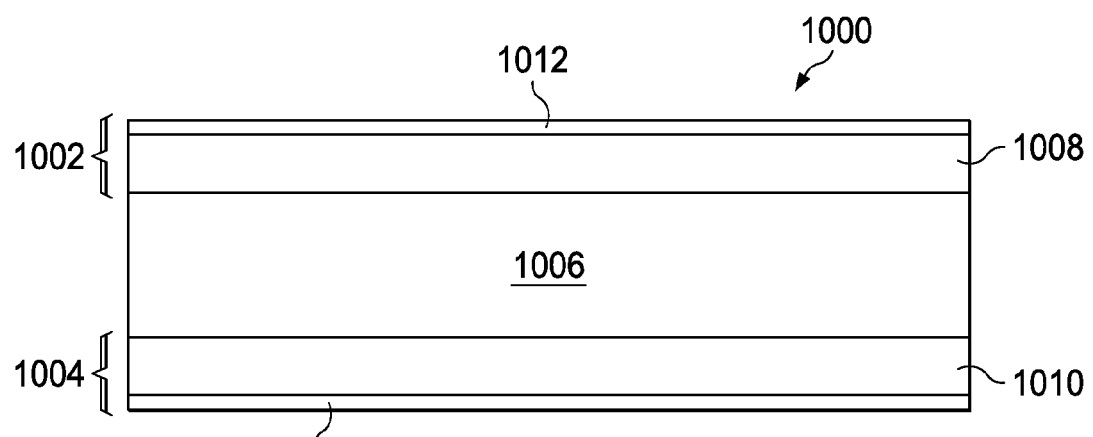
FIG. 10 is an illustration of a trim panel in accordance with an illustrative embodiment.

With reference now to FIG. 10, an illustration of a trim panel is depicted in accordance with an illustrative embodiment. In this illustrative example, trim panel 1000 may be formed using facesheet 1002, facesheet 1004, and core 1006. In this illustrative example, facesheet 1002 may be comprised of acoustic damping device 1008 and facesheet 1004 may be comprised of acoustic damping device 1010.

Of course, in other illustrative examples, other layers may be included in addition to acoustic damping device 1008 and acoustic damping device 1010 to form facesheet 1002 and facesheet 1004 depending on the particular implementation. For example, laminate 1012 may be placed over acoustic damping device 1008 and laminate 1014 may be placed over acoustic damping device 1010.

Core 1006 may take various forms. For example, without limitation, core 1006 may take the form of a solid core, a honeycomb core, a foam core, or some other suitable type of core.

The illustration of example implementations for noise reduction system 204 in FIGS. 3-10 are not meant to imply limitations to the manner in which different noise reduction systems may be implemented. For example, noise reduction system 204 may include one or more acoustic damping structures in addition to acoustic damping structure 410 shown in FIG. 4, acoustic damping structure 602 shown in FIG. 6, acoustic damping structure 802 shown in FIG. 8, and acoustic damping structure 904 shown in FIG. 9. As an example, one acoustic damping structure may be connected to trim panel 402 while another acoustic damping structure is connected to fuselage 106. In another illustrative example, yet another acoustic damping structure may be located between fiberglass blankets in addition to acoustic damping structure 904.

As yet another illustrative example, other numbers of acoustic damping devices may be used to form an acoustic damping structure. For example, three, six, or some other number of acoustic damping devices may be used in an acoustic damping structure. These damping devices may be connected to each other by other components such as spacers, support members, or other suitable structures. In some illustrative examples, the acoustic damping devices may be connected to each other directly.

Although the illustrative examples for an illustrative embodiment in FIGS. 3-10 are described with respect to an aircraft, an illustrative embodiment may be applied to other types of platforms. The platform may be, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a manufacturing facility, a building, a free standing road noise sound barrier, an airport sound barrier, and other suitable objects.

Further, the noise reduction system may be used in other types of areas other than a passenger cabin. For example, noise reduction system 204 may be used to reduce the propagation of sound into an interior area of at least one of a crew area, a cockpit, a cargo area. Further, noise reduction system 204 may be used in other areas in other types of platforms. Examples of other types of areas include, for example, a theater, an office, an operating room, or some other area within a platform.

Figure 11:
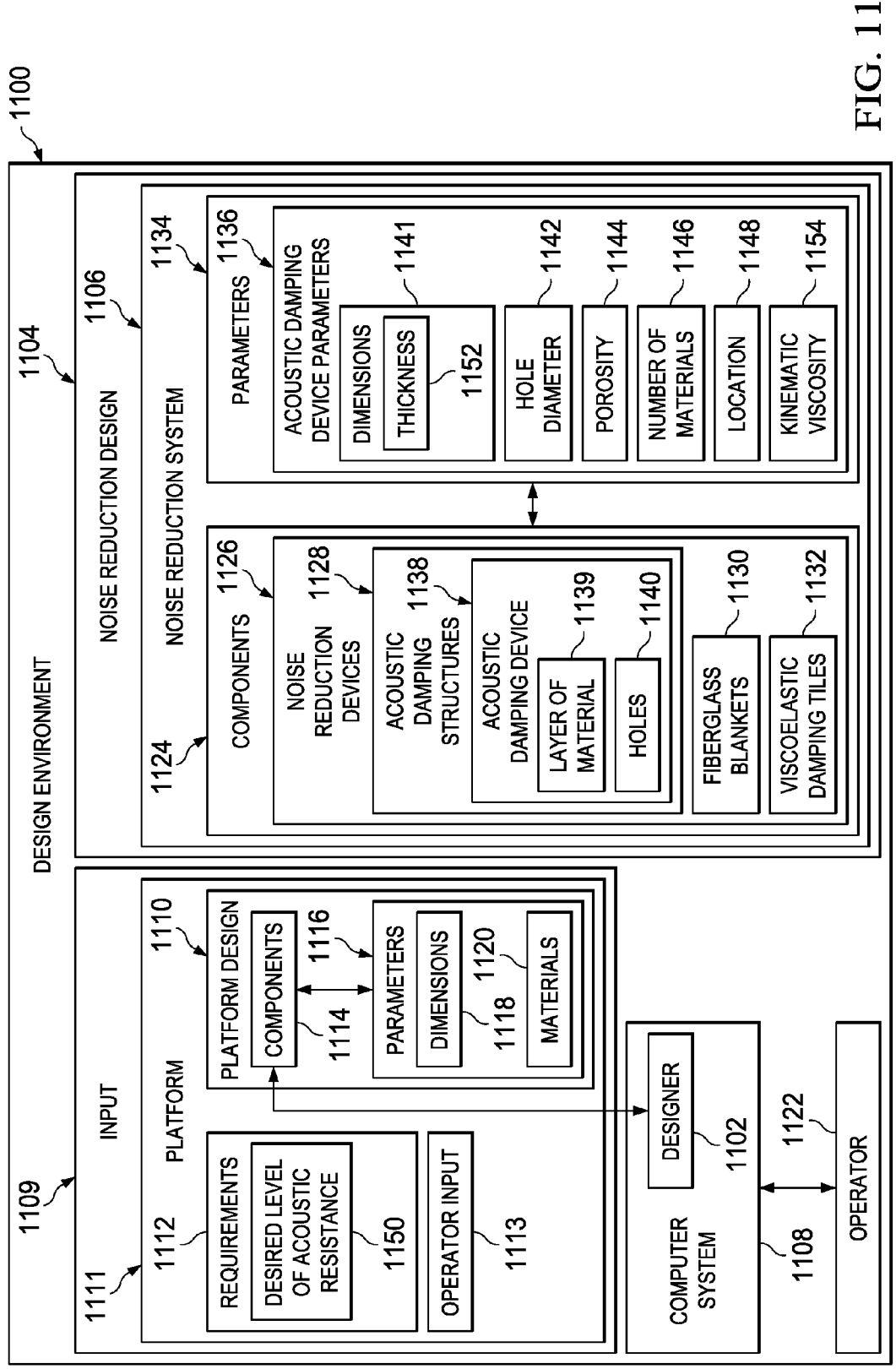
FIG. 11 is an illustration of a block diagram of a design environment in accordance with an illustrative embodiment.

Turning now to FIG. 11, an illustration of a block diagram of a design environment is depicted in accordance with an illustrative embodiment. In this depicted example, design environment 1100 includes designer 1102, which may be used to generate noise reduction design 1104 for noise reduction system 1106. Noise reduction system 1106 is an example of a noise reduction system that may be used in aircraft 100 in FIG. 1 as well as other types of platforms.

In this illustrative example, designer 1102 may be implemented using hardware, software, or a combination of the two. When software is used, operations performed by designer 1102 may be implemented in program code configured to be run on a processor unit. When hardware is employed, the hardware includes circuits that operate to perform the operations in designer 1102.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations.

Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In this illustrative example, designer 1102 may be implemented using computer system 1108. Computer system 1108 is comprised of one or more computers. When more than one computer is present in computer system 1108, those computers may be in communications with each other using a communications medium such as a network.

In this illustrative example, noise reduction design 1104 may be generated using input 1109. Input 1109 may take various forms. For example, input 1109 may include platform design 1110, requirements 1112, operator input 1113, and other types of input.

Platform design 1110 may be for a platform such as aircraft 100 in FIG. 1. Requirements 1112 are requirements for noise reduction system 1106 and may take various forms. For example, requirements 1112 may include at least one of cost, space, weight, amount of sound reduction, and other suitable requirements. Operator input 1113 is input from a human operator.

As depicted, when platform design 1110 is for platform 1111, such as for aircraft 100, components 1114 may be present. Components 1114 may be, for example, without limitation, a fuselage, a floor, trim panels, lighting, passenger chairs, an engine, an engine housing, and other suitable types of components. Components 1114 have parameters 1116. Parameters 1116 include dimensions 1118 and materials 1120. Based on dimensions 1118 and materials 1120, designer 1102 may generate noise reduction design 1104 with input from operator 1122.

In this illustrative example, noise reduction system 1106 in noise reduction design 1104 includes components 1124. Components 1124 include noise reduction devices 1126. For example, components 1124 in noise reduction system 1106 may include a number of acoustic damping structures 1128, fiberglass blankets 1130, viscoelastic damping tiles 1132, and other types of noise reduction devices.

As depicted, noise reduction design 1104 includes parameters 1134 for components 1124 in noise reduction system 1106. These parameters may be selected by designer 1102 based on input 1109.

In designing components 1124 and selecting parameters 1134 for components 1124, various factors are taken into consideration. For example, the vibrations and noise radiation from a structure in platform 1111 are dominated by transverse vibrations or bending waves propagating in the structure.

The structure transmits sound energy through the structure based on the intrinsic properties of the structure and carries most of the vibration energy in the form of bending energy. For example, when platform 1111 takes the form of aircraft 100 in FIG. 1, controlling noise in cabin 200 in. FIG. 2 of aircraft 100 relies on improving sidewall attenuation by passive "add-on" treatments to reduce or absorb vibration, noise energy, or both vibration and noise energy.

Currently used passive methods involve adding mass, damping, acoustic absorption, or other suitable methods of noise reduction. For example, viscoelastic damping tiles 1132 may be added to the fuselage to absorb fuselage vibrations. These tiles are usually efficient in the mid to high frequency range, such as about 500 Hz to about 5,000 Hz. However, these tiles may not provide a desired level of noise reduction for lower frequencies.

As another example, fiberglass insulation may be used to reduce noise transmission from the exterior of a fuselage to the interior of a cabin. However, fiberglass insulation in fiberglass blankets 1130 provides little improvement in transmission loss of the noise control treatment of a fuselage sidewall treatment package in the low frequency region below about 500 Hz. Fiberglass insulation in fiberglass blankets 1130 may provide more noise control in the higher frequency range. Fiberglass blankets 1130 also may provide much needed thermal insulation.

The innermost impervious mass layer in a passenger cabin may be a trim panel. Trim panels serve as decorative panels that give the passenger cabin a finished appearance. These trim panels may provide little, if any, noise reduction in an aircraft. Thus, in generating noise reduction design 1104 for noise reduction system 1106, fiberglass blankets 1130 and trim panels are ineffective in improving the low-frequency sound transmission loss of an aircraft fuselage sidewall.

Development and design of lightweight and efficient add-on noise control treatment is a factor in designing noise reduction system 1106 for aircraft cabin noise control. Add-on constrained layer damping is an important part of the noise control treatment to partially damp vibrations and sound to prevent sound propagation inside the aircraft cabin. However, such viscoelastic damping tiles 1132 may not be as effective in the low frequency range as desired.

This low frequency range is typically below about 500 Hz. Also, viscoelastic damping tiles 1132 are comparatively heavy and may add more weight to the aircraft than desired. Further, the viscoelastic material in viscoelastic damping tiles 1132 is usually tailored or tuned to low temperatures as aircraft skin is exposed to low temperatures. The low temperatures may be, for example, about −40° C. and are typically encountered in cruise flight at high altitudes. Thus, damping treatment is not very effective at lower altitude and/or at higher temperatures, such as those above about −20° C. Consequently, acoustic damping structures 1128 may be designed to overcome at least some of the issues that occur with fiberglass blankets 1130 and viscoelastic damping tiles 1132.

The illustrative embodiments recognize and take into account that transmission of acoustic energy from one region to another region is passively controlled or reduced by two main methods. In the first approach, sound energy is absorbed by components 1124 with materials that are designed and matched to accept sound and then efficiently dissipate the sound into heat energy. Such systems may be, for example, acoustic blankets, porous material, absorbent duct liners, and other similar components.

In the second method, components 1124 reflect sound by inserting a large change in acoustic impedance into the transmission path. Examples of these types of components include metal sheets such as room walls, noise control enclosures, expansion chambers, and other similar components. Thus, sound can be blocked or reflected back by a change in acoustic impedance, which need not include sound absorption as the main mechanism. When sound is blocked or reflected from a surface, transmission loss of the sound is present. This transmission loss may be measured.

In these illustrative examples, TL is transmission loss and is the classic measure of the sound attenuation properties of a simple panel and can be defined in terms of transmission co-efficient, τ, as follows:

$$TL = 10\log\left(\frac{1}{\tau}\right), \quad (1)$$

$$\tau = \frac{\Pi_t}{\Pi_i}, \quad (2)$$

where $\Pi_t$ is transmitted acoustic power and $\Pi_i$ is incident acoustic power on the panel. Transmission loss may be measured independent of installation.

Similarly, the reflection co-efficient, r, is defined as the ratio of the reflected acoustic power to the incident acoustic power:

$$r = \frac{\Pi_r}{\Pi_i} \quad (3)$$

The absorption co-efficient is now defined as the ratio of acoustic power that is not reflected back to the incident acoustic power or:

$$\alpha = 1 - r. \quad (4)$$

Thus, the transmission loss and the absorption coefficient are two different acoustic parameters. Transmission loss of a structure is a measure of loss of acoustic energy as sound pass through the structure. For example, a simple metal sheet reflects sound energy but also allows it to pass through the sheet based on the well-known "mass law." The classical mass law formula for a simple panel for plane waves at normal incidence is given by:

$$\tau = \left(\frac{2\rho c}{\omega m}\right)^2, \quad (5)$$

$$TL = 20\log\left(\frac{\omega m}{2\rho c}\right) \quad (6)$$

where m is surface mass density of a panel and ω is circular frequency (=2πf). The mass law states that panel TL increases by about 6 dB by doubling the mass or the frequency. In the above formula, structural damping is assumed negligible in these illustrative examples.

In a simple electro-mechanical analogue circuit analogy, mass of the panel may be represented by electrical inductance, stiffness by capacitance, and mechanical damping by resistance. The panel impedance, $Z_p$, may be represented by:

$$Z_p = j\omega m + \eta + \frac{\kappa}{j\omega}, \quad (7)$$

where η is structural damping, κ is a bending stiffness of the panel, and j is an imaginary operator.

The acoustic energy which is converted to vibration energy of the panel is absorbed by structural damping which is the resistive part of the impedance. In contrast, jωm and κ/jω are inductance terms and do not absorb energy. By increasing structural damping of the panel, transmission loss of the panel may be increased. However, adding damping to the structure is often more costly than desired and involves adding weight to platform 1111.

The effects of the bending stiffness of the structure show up in the form of mechanical resonances of the structure which may reduce transmission loss at resonant frequencies. In these illustrative examples, sound transmission loss of a composite structure can be greatly but adversely influenced by resonances induced by the stiffness of the structure.

For acoustically absorptive materials, the absorption of sound is mostly facilitated by the acoustic resistance offered by fibrous materials. In the electro-acoustic analogue equivalent circuit, acoustic resistance of a fibrous material is represented by electrical resistance which absorbs energy. Acoustic inductance and capacitance of the material reflect sound and create an impedance mismatch between the material and ambient medium.

The acoustic elements, such as a Helmholtz resonator, may have acoustic capacitance in the form of a volume, acoustic inductance and resistance offered by a pipe or neck. At the tuned frequency of a classical Helmholtz resonator, acoustic capacitance and inductance are cancelled and energy is absorbed by acoustic resistance built in the small neck or pipe.

Fibrous materials, on the other hand, offer both acoustic resistance and inductance over a wide frequency range and become absorptive only when the overall acoustic impedance matches that of the ambient medium. However, an inherent limitation is present in fibrous or porous materials. This limitation provides that acoustic resistance and inductance cannot be varied independently of each other.

For example, any change in acoustic impedance of fibrous materials requires a basic change in formulation and manufacture of such materials. Currently, such changes have been tried but have not shown much success. Thus, acoustic damping device 1138 with a desired level of acoustic resistance may be needed for desired transmission loss of a sound traveling through noise reduction system 1106.

In these illustrative examples, acoustic damping device 1138 is implemented in a manner to provide a desired level or acoustic resistance that results in a desired level of sound reduction. Holes 1140 and other parameters in acoustic damping device 1138 may be selected to have desired acoustic resistance properties.

As depicted, acoustic damping device 1138 is designed with desired level of acoustic resistance 1150, rather than for sound absorption. Further, acoustic damping device 1138 is designed to operate over a wide frequency range. This frequency range may be, for example, from about 250 Hz to about 10,000 Hz.

Thus, acoustic damping device 1138 offers a unique method of introducing appropriately tailored acoustic resistance in noise reduction system 1106 to be inserted in the path of propagation of sound energy. Due to enhanced acoustic resistance and damping, transmission loss of the structure with noise reduction system 1106 may be significantly improved.

In these illustrative examples, acoustic damping device parameters 1136 are examples of parameters 1134 for acoustic damping device 1138 in acoustic damping structures 1128. Acoustic damping device 1138 includes layer of material 1139 and holes 1140. Acoustic damping device parameters 1136 include at least one of dimensions 1141, hole diameter 1142, porosity 1144, number of materials 1146, location 1148, kinematic viscosity 1154, and other suitable parameters.

Number of materials 1146 may be selected based on various requirements in requirement 1112. For example, without limitation, number of materials 1146 may be selected from at least one of polycarbonate, latex, plastic, fiberglass, composite material, acrylic, aluminum, a polymer, polyvinyl butyral, and other suitable materials. The selection of number of materials 1146 may be based on factors such as cost, weight, durability, and other suitable factors. In the illustrative examples, the materials may be selected as having a desired weight and being non-conductive.

In selecting acoustic damping device parameters 1136, requirements 1112 may include desired level of acoustic resistance 1150. Desired level of acoustic resistance 1150 may be a desired level of acoustic resistance for platform design 1110 in a particular location.

The specific acoustic impedance of acoustic damping device 1138 is given by:

$$Z = R + j\omega M - jC, \qquad (8)$$

where Z is the specific acoustic impedance, R is acoustic resistance, M is reactance and C is compliance.

In one illustrative example, acoustic resistance may be defined as follows:

$$R = \left(32\mu\rho\frac{t}{Pa^2}\right)\left[\sqrt{1 + \frac{v^2}{32}} + 0.177v\frac{a}{t}\right] \qquad (9)$$

Where R is the acoustic resistance, $\mu$ is the absolute viscosity of the fluid, t is thickness 1152 of layer of material 1139, a is hole diameter 1142 for holes 1140, P is porosity 1144 of layer of material 1139, and v is kinematic viscosity 1154 of layer of material 1139. Equation (9) is one of the illustrative examples of how acoustic resistance may be set. In other illustrative examples, other equations may be used to set the acoustic resistance. The kinematic viscosity is characterized by the ratio of the absolute viscosity of the fluid to the fluid density, as follows:

$$v = \frac{\mu}{\rho} \qquad (10)$$

Where $\rho$ is fluid density and $\mu$ is the absolute viscosity of the fluid.

Equation (9) may be approximated as follows:

$$R \approx \left(32\mu\rho\frac{t}{Pa^2}\right). \qquad (11)$$

Thus, if the value for acoustic resistance is known based on desired level of acoustic resistance 1150 in requirements 1112, other variables in the equation may be selected to set thickness 1152 in dimensions 1141, hole diameter 1142, and porosity 1144. In these illustrative examples, porosity 1144 is the ratio of the area in layer of material 1139 in which holes 1140 are present to the total area for layer of material 1139.

The illustration of design environment 1100 in FIG. 11 is not meant to imply limitations to the manner in which a design environment may be implemented for designing noise reduction systems. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, acoustic damping device parameters 1136 may include other parameters in addition to or in place of the ones illustrated. For example, dimensions 1141 may also include a length and a width in addition to thickness 1152. Further, acoustic damping device parameters 1136 also may include one or more additional hole diameters in addition to hole diameter 1142 when holes 1140 do not all have the same diameter. Further, acoustic damping device parameters 1136 also may include a distribution or pattern for holes 1140.

As yet another example, acoustic damping structures 1128 may be designed for implementation in a new platform or an existing platform. For example, when acoustic damping structures 1128 are designed for use with existing platforms, these structures may take the form of acoustic damping patches. These acoustic damping patches may be attached to existing structures in a platform with an adhesive or other type of fastening system.

Figure 12:
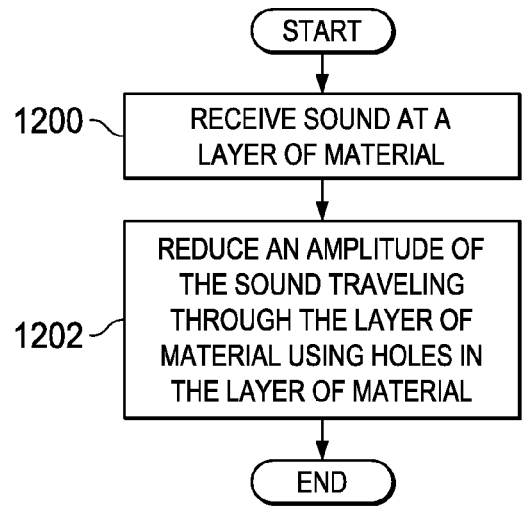
FIG. 12 is an illustration of a flowchart of a process for reducing noise in accordance with an illustrative embodiment.

Turning now to FIG. 12, an illustration of a flowchart of a process for reducing noise is depicted in accordance with an illustrative embodiment. The process illustrated in FIG. 12 may be implemented using noise reduction system 204 in FIG. 2.

The process begins by receiving sound at a layer of material (operation 1200). The process then reduces an amplitude of the sound traveling through the layer of material using holes in the layer of material (operation 1202) with the process terminating thereafter. These holes in the layer of material may extend from a first side of the layer of material to a second side of the layer of material in a manner that provides a desired level of acoustic resistance to the sound traveling through the layer of material.

Figure 13:
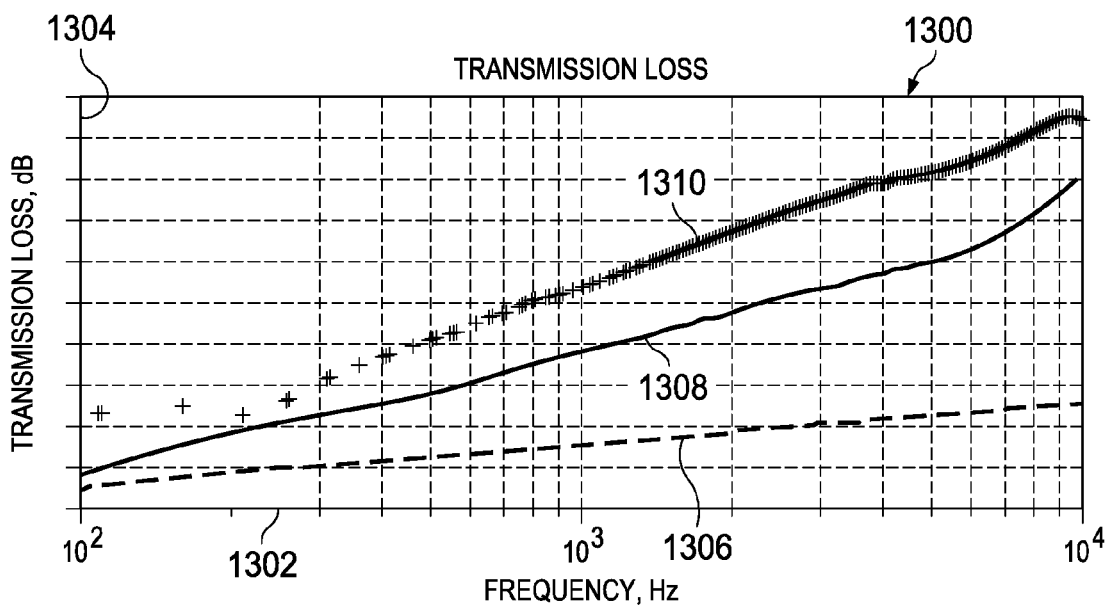
FIG. 13 is an illustration of a graph showing the effect of the use of an acoustic dampening device on noise in a fuselage panel is depicted in accordance with an illustrative embodiment.

With reference now to FIG. 13, a graph showing the effect of the use of an acoustic dampening device in a fuselage panel is depicted in accordance with an illustrative embodiment. In graph 1300, x-axis 1302 represents frequency in Hertz (Hz), and y-axis 1304 represents transmission loss in 20 decibel (dB) increments.

In graph 1300, line 1306 illustrates transmission loss of sound traveling through just a fuselage panel. Line 1308 illustrates transmission loss of sound traveling through the fuselage panel, a porous insulator such as a fiberglass blanket, and a trim panel such as a wall panel for an aircraft. The porous insulator is located between the fuselage panel and the trim panel.

Line 1310 illustrates transmission loss of sound traveling through the fuselage panel, a porous insulator such as a fiberglass blanket, a trim panel such as a wall panel for an aircraft, and an acoustic damping structure including one or more acoustic damping devices, such as acoustic damping device 1138 in FIG. 11. The acoustic dampening structure is located between the fuselage panel and the porous insulator in this example. As can be seen, the fuselage and the trim panels does not provide as high of a level of transmission loss or sound reduction as when the porous insulator is present. The presence of the acoustic damping structure significantly improves the transmission loss of the fuselage panel with fiberglass blanket and trim panel.

Figure 14:
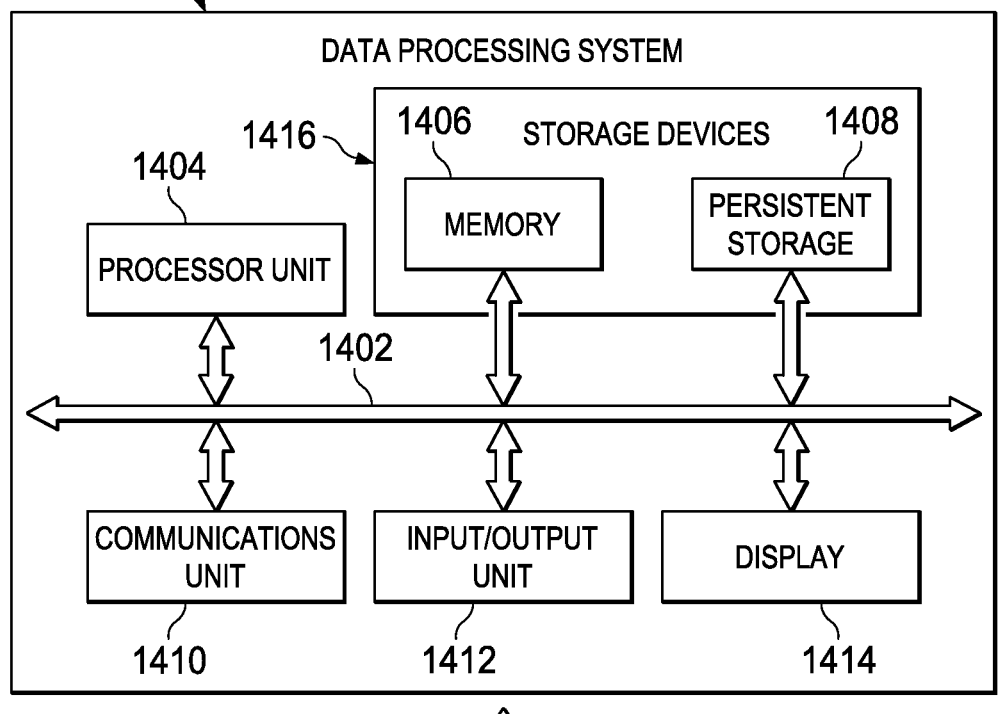
FIG. 14 is an illustration of a block diagram of a data processing system in accordance with an illustrative embodiment.

Turning now to FIG. 14, an illustration of block diagram of a data processing system is depicted in accordance with an illustrative embodiment. Data processing system 1400 may be used to implement computer system 1108 in FIG. 11. In this illustrative example, data processing system 1400 includes communications framework 1402, which provides communications between processor unit 1404, memory 1406, persistent storage 1408, communications unit 1410, input/output unit 1412, and display 1414. In this example, communication framework may take the form of a bus system.

Processor unit 1404 serves to execute instructions for software that may be loaded into memory 1406. Processor unit 1404 may be a number of processors, a multi-processor core, or some other type of processor, depending on the particular implementation.

Memory 1406 and persistent storage 1408 are examples of storage devices 1416. A storage device is any piece of hardware that is capable of storing information, such as, for example, without limitation, data, program code in functional form, and/or other suitable information either on a temporary basis and/or a permanent basis. Storage devices 1416 may also be referred to as computer readable storage devices in these illustrative examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that may be connected to data processing system 1400. For example, input/output unit 1412 may provide a connection for user input through a keyboard, a mouse, and/or some other suitable input device. Further, input/output unit 1412 may send output to a printer. Display 1414 provides a mechanism to display information to a user.

Instructions for the operating system, applications, and/or programs may be located in storage devices 1416, which are in communication with processor unit 1404 through communications framework 1402. The processes of the different embodiments may be performed by processor unit 1404 using computer-implemented instructions, which may be located in a memory, such as memory 1406.

These instructions are referred to as program code, computer usable program code, or computer readable program code that may be read and executed by a processor in processor unit 1404. The program code in the different embodiments may be embodied on different physical or computer readable storage media, such as memory 1406 or persistent storage 1408.

Program code 1418 is located in a functional form on computer readable media 1420 that is selectively removable and may be loaded onto or transferred to data processing system 1400 for execution by processor unit 1404. Program code 1418 and computer readable media 1420 form computer program product 1422 in these illustrative examples. In one example, computer readable media 1420 may be computer readable storage media 1424 or computer readable signal media 1426.

In these illustrative examples, computer readable storage media 1424 is a physical or tangible storage device used to store program code 1418 rather than a medium that propagates or transmits program code 1418.

Alternatively, program code 1418 may be transferred to data processing system 1400 using computer readable signal media 1426. Computer readable signal media 1426 may be, for example, a propagated data signal containing program code 1418. For example, computer readable signal media 1426 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1400 are not meant to provide architectural limitations to the manner in which different embodiments may be implemented. The different illustrative embodiments may be implemented in a data processing system including components in addition to and/or in place of those illustrated for data processing system 1400. Other components shown in FIG. 14 can be varied from the illustrative examples shown. The different embodiments may be implemented using any hardware device or system capable of running program code 1418.

Figure 15:
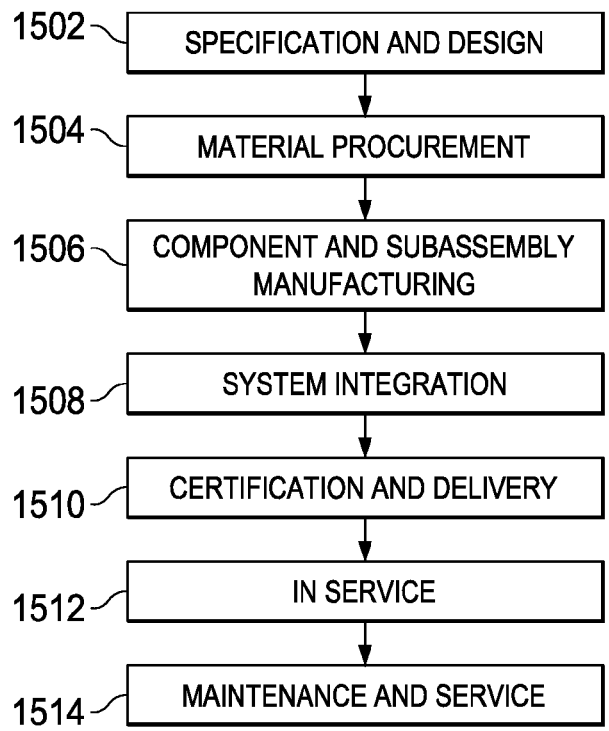
FIG. 15 is an illustration of an aircraft manufacturing and service method in accordance with an illustrative embodiment.
Figure 16:
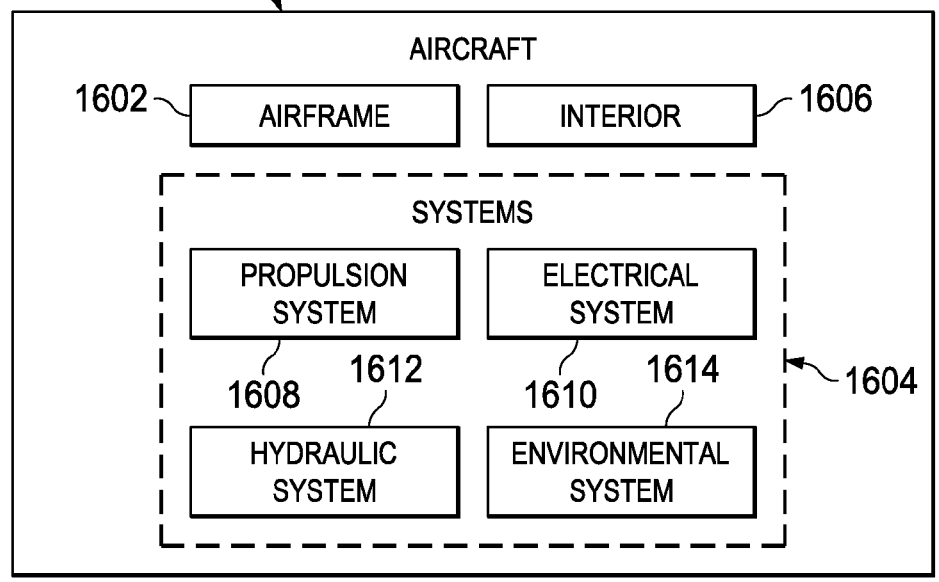
FIG. 16 is an illustration of an aircraft in which an illustrative embodiment may be implemented.

Illustrative embodiments of the disclosure may be described in the context of aircraft manufacturing and service method 1500 as shown in FIG. 15 and aircraft 1600 as shown in FIG. 16. Noise reduction system 204 in FIG. 2 and the components associated with noise reduction system 204 may be implemented in aircraft 1600 during manufacturing and service method 1500.

Turning first to FIG. 15, an illustration of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 in FIG. 16 takes place. Thereafter, aircraft 1600 in FIG. 16 may go through certification and delivery 1510 in order to be placed in service 1512. While in service 1512 by a customer, aircraft 1600 in FIG. 16 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in which an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15.

In one illustrative example, components or subassemblies produced in component and subassembly manufacturing 1506 in FIG. 15 may be fabricated or manufactured in a manner similar to components or subassemblies produced while aircraft 1600 is in service 1512 in FIG. 15. As yet another example, one or more apparatus embodiments, method embodiments, or a combination thereof may be utilized during production stages, such as component and subassembly manufacturing 1506 and system integration 1508 in FIG. 15. One or more apparatus embodiments, method embodiments, or a combination thereof may be utilized while aircraft 1600 is in service 1512 and/or during maintenance and service 1514 in FIG. 15. The use of a number of the different illustrative embodiments may substantially expedite the assembly of and/or reduce the cost of aircraft 1600.

For example, acoustic damping devices may be designed for use in acoustic damping structures in a noise reduction system during specification and design 1502. Additionally, acoustic damping devices may be manufactured during component and subassembly manufacturing 1506. In yet other illustrative examples, acoustic damping devices may operate during certification and delivery 1510 to reduce noise. Noise reduction also may be performed by the operation of acoustic damping devices during in service 1512. Acoustic damping devices may be manufactured and added to aircraft 1600 during maintenance and service 1514 as part of routine maintenance, upgrades, refurbishments, and other suitable operations.

Thus, the illustrative embodiments provide a method and apparatus for reducing noise in a manner that may avoid issues with currently used techniques. In the illustrative examples, acoustic damping devices may be added to existing structures. Further, acoustic damping devices may be used to replace other structures currently used. For example, acoustic damping devices may be used to replace damping tiles currently used in an aircraft. These damping tiles are often more expensive than desired as compared to acoustic damping devices. Additionally, the use of acoustic damping device does not weaken structures in aircraft and other platforms.

With the use of acoustic damping devices that operate to cause acoustic resistance to sound, transmission loss of sound in a structure of a platform may be increased to desirable levels. Additionally, with the use of acoustic damping devices, the thickness and weight of fiberglass blankets may be reduced. Acoustic damping devices also may be used with currently existing fiberglass blankets and trim panels as shown in some of the illustrative examples.

Further, the design and implementation of acoustic damping devices is easier than many other types of damping systems. For example, tuning for low temperatures with viscoelastic damping tiles is unnecessary. Moreover, the acoustic damping devices in the illustrative examples may attenuate the acoustic energy in sound at lower frequencies as compared to fiberglass blankets and viscoelastic damping tiles. In particular, the frequency range provided by the acoustic damping devices is greater than other types of sound damping systems.

Further, the acoustic damping devices may be added on to structures or made integral parts of structures. For example, acoustic damping devices may be integrated as part of panels used in the floor, monument walls, cabin walls, ceiling, and other structures. Additionally, acoustic damping devices may be implemented in composite structures depending on the particular implementation.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
 a layer of material having holes extending from a first side of the layer of material to a second side of the layer of material, wherein the holes are configured to provide a desired level of acoustic resistance to sound traveling through the layer of material, wherein the layer of material is configured to be mounted to a platform, and wherein the holes have a diameter that is substantially equal to a thickness of the layer of material.

2. The apparatus of claim 1 further comprising:
 an adhesive layer on at least one of the first side and the second side of the layer of material, wherein the adhesive layer is configured to connect the layer of material to another layer of material.

3. The apparatus of claim 1, wherein the layer of material is a first layer of material and the holes are first holes and further comprising:
 a second layer of material having second holes extending from a first side of the second layer of material to a second side of the second layer of material, wherein the second holes are configured to provide a desired level of acoustic resistance to sound traveling through the second layer of material.

4. The apparatus of claim 3, wherein the first layer of material is connected to the second layer of material.

5. The apparatus of claim 4, wherein the first layer of material is connected to the second layer of material by a spacer system, wherein space is present between the first layer of material and the second layer of material.

6. The apparatus of claim 5, wherein the first layer of material is a first facesheet for a panel, the second layer of material is a second facesheet for the panel, and the spacer system is a core for the panel.

7. The apparatus of claim 1 further comprising:
a panel, wherein the layer of material is associated with the panel.

8. The apparatus of claim 7, wherein the panel is selected from one of a wall panel, a ceiling panel, and a floor panel.

9. The apparatus of claim 7, wherein the layer of material and the panel form a noise reduction system for an interior area of the platform.

10. The apparatus of claim 1, wherein the layer of material is configured to be attached to a fuselage of an aircraft.

11. The apparatus of claim 1, wherein the first holes have a diameter that is substantially equal to a thickness of the first layer of material and wherein the second holes have a second diameter that is substantially different than a thickness of the second layer of material.

12. The apparatus of claim 1, wherein the desired level of acoustic resistance is selected using parameters selected from at least one of a hole diameter, a thickness of the layer of material, and a porosity of the layer of material.

13. The apparatus of claim 1, wherein the desired level of acoustic resistance is set as follows:

$$R = \left(32\mu\rho\frac{t}{Pa^2}\right)\left[\sqrt{1+\frac{v^2}{32}} + 0.177v\frac{a}{t}\right]$$

Where R is an acoustic resistance, µ is an absolute viscosity of a fluid, t is a thickness of the layer of material, a is a hole diameter, P is a porosity of the layer of material, and v is a kinematic viscosity of the layer of material.

14. The apparatus of claim 1, wherein the layer of material dampens sound in a frequency range from about 250 Hz to about 10,000 Hz.

15. The apparatus of claim 1, wherein the layer of material is comprised of a number of materials, at least one of which is selected from the group consisting of a polycarbonate, latex, plastic, fiberglass, composite material, acrylic, aluminum, a polymer, and polyvinyl butyral.

16. The apparatus of claim 1, wherein the platform is selected from one of a mobile platform, a stationary platform, a land-based structure, an aquatic-based structure, a space-based structure, a surface ship, a tank, a personnel carrier, a train, a spacecraft, a space station, a satellite, a submarine, an automobile, a power plant, a bridge, a dam, a house, a manufacturing facility, and a building.

17. A method for reducing sound, the method comprising:
receiving sound at a layer of material; and
reducing an amplitude of the sound traveling through the layer of material using holes in the layer of material that extend from a first side of the layer of material to a second side of the layer of material in a manner that provides a desired level of acoustic resistance to the sound traveling through the layer of material, and wherein the holes have a diameter that is substantially equal to a thickness of the layer of material.

18. The method of claim 17, wherein reducing the amplitude of the sound traveling through the layer of material using the holes in the layer of material that extend from the first side of the layer of material to the second side of the layer of material in the manner that provides the desired level of acoustic resistance to the sound traveling through the layer of material into an interior area of a platform.

19. The method of claim 18, wherein the interior area is selected from one of a passenger cabin, a crew area, a cockpit, a cargo area, a theater, an office, and an operating room.

20. The method of claim 17, wherein the desired level of acoustic resistance is set as follows:

$$R = \left(32\mu\rho\frac{t}{Pa^2}\right)\left[\sqrt{1+\frac{v^2}{32}} + 0.177v\frac{a}{t}\right]$$

Where R is an acoustic resistance, µ is an absolute viscosity of a fluid, t is a thickness of the layer of material, a is a hole diameter, P is a porosity of the layer of material, and v is a kinematic viscosity of the layer of material.

* * * * *